United States Patent
Jeong et al.

(10) Patent No.: US 7,284,874 B2
(45) Date of Patent: Oct. 23, 2007

(54) LED BACKLIGHT UNIT INCLUDING COOLING STRUCTURE

(75) Inventors: In Suk Jeong, Seoul (KR); Gi Bin Kim, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 166 days.

(21) Appl. No.: 11/117,603

(22) Filed: Apr. 29, 2005

(65) Prior Publication Data

US 2006/0002142 A1    Jan. 5, 2006

(30) Foreign Application Priority Data

Jun. 28, 2004   (KR) .................... 10-2004-0048799

(51) Int. Cl.
  *G09F 13/04*  (2006.01)
  *F21V 29/00*  (2006.01)

(52) U.S. Cl. .................. 362/97; 362/249; 362/294; 257/715

(58) Field of Classification Search ............. 362/249, 362/294, 97, 252; 257/715; 165/104.26; 361/700
See application file for complete search history.

(56) References Cited

U.S. PATENT DOCUMENTS

| | | | | |
|---|---|---|---|---|
| 5,268,812 A | * | 12/1993 | Conte .................... 257/715 |
| 5,465,782 A | * | 11/1995 | Sun et al. .............. 165/104.26 |
| 5,660,461 A | * | 8/1997 | Ignatius et al. ............. 362/241 |
| 5,857,767 A | * | 1/1999 | Hochstein ................... 362/294 |
| 6,375,340 B1 | * | 4/2002 | Biebl et al. ................. 362/294 |
| 6,717,813 B1 | * | 4/2004 | Garner ...................... 361/700 |
| 6,827,134 B1 | * | 12/2004 | Rightley et al. ....... 165/104.26 |
| 6,880,626 B2 | * | 4/2005 | Lindemuth et al. .... 165/104.26 |
| 2003/0072153 A1 | * | 4/2003 | Matsui et al. ............... 362/294 |
| 2003/0156416 A1 | * | 8/2003 | Stopa et al. ................ 362/294 |
| 2004/0213016 A1 | * | 10/2004 | Rice .......................... 362/373 |
| 2005/0047140 A1 | * | 3/2005 | Chang ........................ 362/294 |
| 2006/0232969 A1 | * | 10/2006 | Bogner et al. ............. 362/252 |

* cited by examiner

*Primary Examiner*—Jong-Suk (James) Lee
*Assistant Examiner*—Ismael Negron
(74) *Attorney, Agent, or Firm*—Birch, Stewart, Kolasch & Birch, LLP

(57) ABSTRACT

A backlight unit is provided with LEDs having a cooling structure. The backlight according to an embodiment includes a heat pipe, which is disposed below a PCB having the LEDs thereon, and a heat sink connected with the heat pipe. In operation, heat generated from the LEDs is conducted via the PCB and the heat pipe and is radiated by the heat sink.

22 Claims, 11 Drawing Sheets

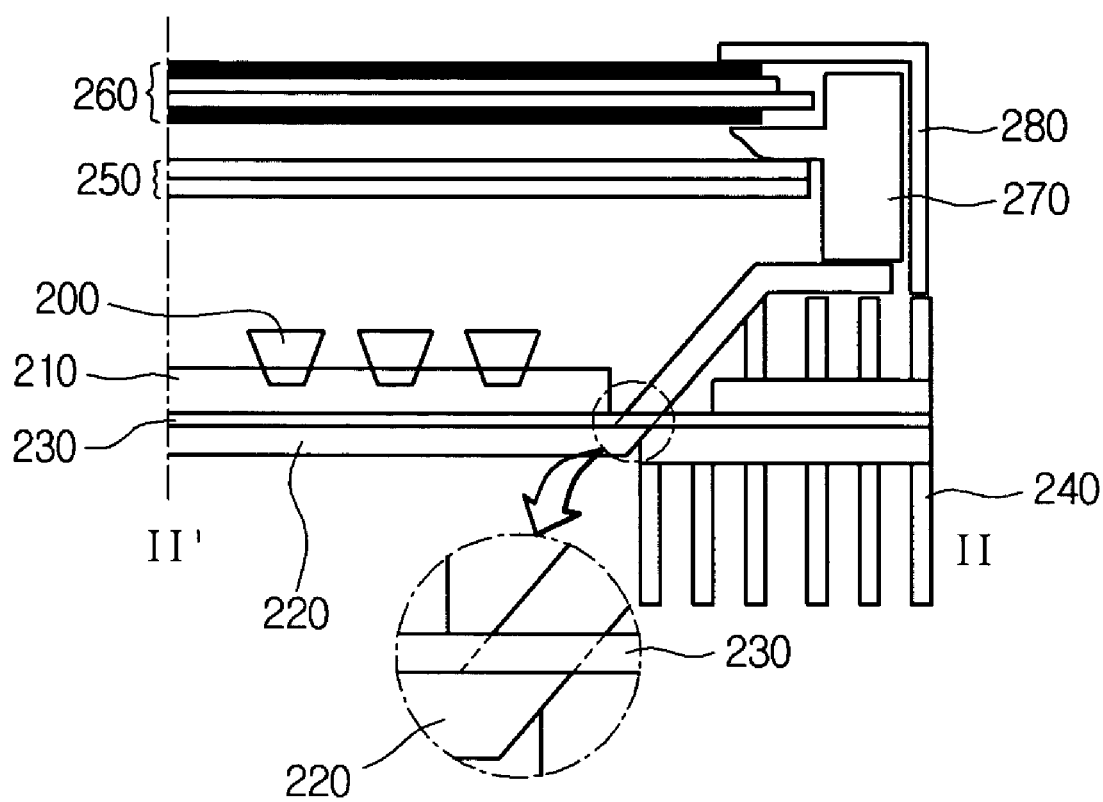

LED BACKLIGHT UNIT INCLUDING COOLING STRUCTURE

CROSS-REFERENCE OF APPLICATION

This application claims priority under 35 U.S.C. §119 of Korean Patent Application No. 48799/2004 filed Jun. 28, 2004, the entire contents of which are hereby incorporated by reference.

BACKGROUND OF THE INVENTION

1. Field of the Invention

The invention relates to a backlight unit, and more particularly, to a backlight unit provided with a light emitting diode (LED) having a cooling structure.

2. Description of the Related Art

Generally, a cathode ray tube (CRT) is one of the displays usable as a monitor of a television, a meter, an information terminal or the like. However, CRT technology has failed to actively cope with the miniaturization and reduced weight requirements of electronic appliances due to the weight and volume of CRTs. In other words, the CRT is limited by its weight and volume, which is disadvantageous to the trend toward miniaturization and reduced weight of electronic appliances.

To solve the drawbacks of CRTs, flat panel displays have emerged, which include a liquid crystal display device (LCD) using the electro-optic properties of liquid crystal, a plasma display panel (PDP) using gas discharge, an electroluminescence display (ELD) using the electro-luminescence effect, etc.

Since the LCD has advantages such as a slim profile, light weight and low power consumption, it finds utilization as a monitor of a laptop computer, a monitor of a desktop computer, a large-sized information display and the like.

Since most LCDs are light receiving devices that display an image by adjusting the amount of light that is incident from the outside, they essentially require a light source that projects light to the LCD panel, i.e., a backlight.

The backlights used as light sources for LCDs are classified into edge type and direct type depending on where a cylindrical fluorescent lamp is located.

The edge type backlight includes a lamp unit disposed at a side of a light guide plate for guiding light. The lamp unit includes a lamp for emitting light, and a lamp holder is inserted into both ends of the lamp to protect the lamp. A lamp reflector encloses an outer circumferential surface of the lamp and a side portion inserted into a side portion of the light guide plate, for reflecting the light of the lamp toward the light guide plate.

The edge type backlights are employed in small-sized LCDs such as a monitor of a laptop computer or a monitor of a desktop computer.

Also, the direct type backlight has been actively developed as the size of the LCD increases to 20 inches or more. In the direct type LCD, multiple lamps are arranged below a diffusion plate to project light toward a front surface of the LCD panel.

Since the direct type backlight has a higher light efficiency than the edge type backlight, it is mainly used in a large-sized LCD requiring high brightness.

However, the LCD employing the direct type backlight is generally used in a large-sized monitor, i.e., a television or the like, and its usage time is significantly long. Also, the LCD employing the direct type backlight uses a number of lamps, and the lamps may be disordered or lose durability, so that they may not turn on.

Also, an LCD can employ the edge type backlight in which lamp units are respectively installed at both sides of the light guide plate. In this configuration, if one lamp fails and does not turn on, the brightness of the LCD decreases, but a serious problem does not result.

However, an LCD employing the direct type backlight has multiple lamps installed below the LCD panel, and if one lamp does not turn on due to the loss of durability or failure, a portion where the lamp is not turned on becomes noticeably dark compared with other portions. Thus the portion where the lamp is not turned on is a visible defect on the display.

Also, the backlight includes a drawback arising from light efficiency being lowered due to disassembly and assembly of the fluorescent lamps or heat generation.

Recent trends require that the direct type backlight unit as well as the edge type backlight unit be miniaturized, be slimmed down and have low weight. To meet these requirements, the related art backlight unit employs a light emitting diode (LED) that has the advantages of good power consumption, weight, brightness and the like.

FIGS. 1A and 1B are plane and sectional views illustrating a direct type backlight unit provided with an LED.

FIGS. 1A and 1B show a direct type backlight unit that includes multiple LEDs 10 serving as a fluorescent lamp, a printed circuit board (PCB) 12 disposed below the LEDs 10, a bottom cover 14 on which the PCB 12 is mounted, and optical sheets 16 including a diffusion sheet for diffusing the light generated by the LEDs 10.

An LCD panel 18 is disposed above the backlight unit as shown in FIG. 1B, and the LCD panel 18 and the backlight unit are supported by a guide panel 17 and are fixed by a top case 19.

The LEDs 10 include sequentially arranged red LEDs for generating red light, green LEDs for generating green light, and blue LEDs for generating blue light. The PCB 12 includes a circuit for controlling the LEDs 10. Also, the PCB 12 supports the LEDs 10 and simultaneously controls light emission of the LEDs 10 using the circuit for controlling the LEDs 10. The optical sheets 16 including the diffusion sheet are spaced apart by a predetermined distance from the LEDs 10 such that the different lights generated by the LEDs 10 distribute uniformly.

As shown in FIG. 1A, the LEDs 10 include red (R), green (G) and blue (B) LEDs, that are arranged sequentially and repeatedly. For Example, the LEDs 10 are turned on or off in the order of R of $1^{st}$ line→R of $2^{nd}$ line→R of $3^{rd}$ line→G of $1^{st}$ line→G of $2^{nd}$ line→G of $3^{rd}$ line→B of $1^{st}$ line→B of $2^{nd}$ line→B of $3^{rd}$ line. However, other sequences can be used.

Since the LEDs have a lower light efficiency than the related art CCFLs (cold cathode fluorescent lamps), they consume much more power than the related art CCFLs, which results in the generation of much heat.

As can be seen from the structure depicted in FIG. 1B, in the related art LCD, most of heat generated by the LEDs diffuses to the bottom cover 14 disposed at the rear of the LCD, and the heat is then radiated. In a real measurement, the bottom cover 14 shows a temperature range of 80 to 90° C., which is due to the insufficient heat radiation capacity of the bottom cover 14.

This 80 to 90° C. temperature range is higher by about 40° C. than the temperature range of the backlight unit provided with CCFLs, and serves as a serious drawback by causing deformation of the optical sheets, by destroying LED junctions, by decreasing the light efficiency of LEDs, and by degenerating the liquid crystal material to seriously decrease the reliability of the main parts of the display.

SUMMARY OF THE INVENTION

Accordingly, the invention is directed to a backlight unit that substantially obviates one or more problems due to limitations and disadvantages of the related art.

An object of the invention is, in part, to provide a backlight unit provided with multiple LEDs having a cooling structure that can optimally suppress the temperature rise to enhance the thermal reliability and increase the light efficiency to thus simultaneously increase brightness and decrease power consumption.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The invention, in part, pertains to a backlight unit that includes multiple LEDs for generating light, a PCB disposed below the LEDs, a bottom cover over which the PCB is mounted, a heat pipe disposed between the PCB and the bottom cover, and a heat sink disposed over a surface of the bottom cover, for radiating the heat generated from the LEDs.

In the invention, the heat pipe can have a cross section that includes an outer container, a vapor core inside the outer container, and a wick between the outer container and the vapor core. The heat pipe can longitudinally have an evaporator section, an adiabatic section adjacent to the evaporator section, and a condenser section adjacent to the adiabatic section. The heat pipe can be formed from copper, tungsten, alloys of copper or tungsten, ceramic or stainless steel.

In the invention, the backlight unit can further have an optical sheet spaced apart by a predetermined distance from the LEDs. The heat pipe can have a plate shape or a cylindrical shape. The heat sink can be disposed at both sides of the bottom cover. The PCB can have a circuit for controlling light emission by the LEDs, and the PCB can be a metal core PCB. Also, the heat pipe can have an end connected to the heat sink, and the heat sink can be disposed over an outer surface of the bottom cover. Heat generated from the LEDs is radiated by the heat sink via the PCB and the heat pipe.

The invention, in part, pertains to a backlight unit that includes multiple LEDs arranged at each line for generating light, multiple PCBs disposed below the LEDs, a bottom cover over which the PCBs are mounted, multiple heat pipes disposed between the PCBs and the bottom cover, and a heat sink disposed over a surface of the bottom cover, for radiating heat generated from the LEDs.

In the invention, the heat pipes can be provided corresponding to each of the PCBs. In the invention, the backlight unit can further have an optical sheet spaced apart by a predetermined distance from the LEDs. The heat pipes can have a plate shape. The heat sink can be disposed at both sides of the bottom cover. The PCBs have a circuit for controlling light emission by the LEDs, and the PCBs can be a metal core type PCB. Also, the heat pipes can have an end connected to the heat sink. The heat sink is disposed on an outer surface of the bottom cover, and the heat generated from the LEDs is radiated by the heat sink via the PCBs and the heat pipes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2C shows a sectional view taken along the line II-II' of FIG. 2A;

DETAILED DESCRIPTION OF THE INVENTION

Reference will now be made in detail to the preferred embodiments of the present invention, examples of which are illustrated in the accompanying drawings.

Figure 1A:
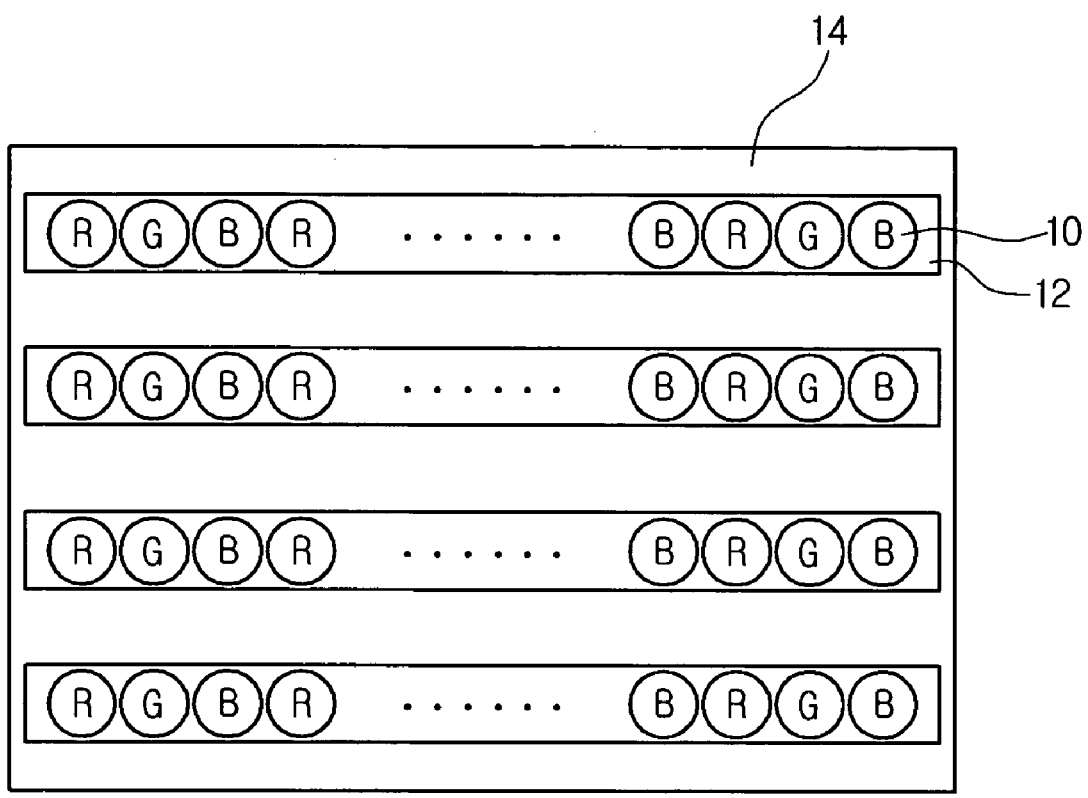
FIGS. 1A and 1B are a plane view and a sectional view illustrating a direct type backlight unit provided with an LED.
Figure 1B:
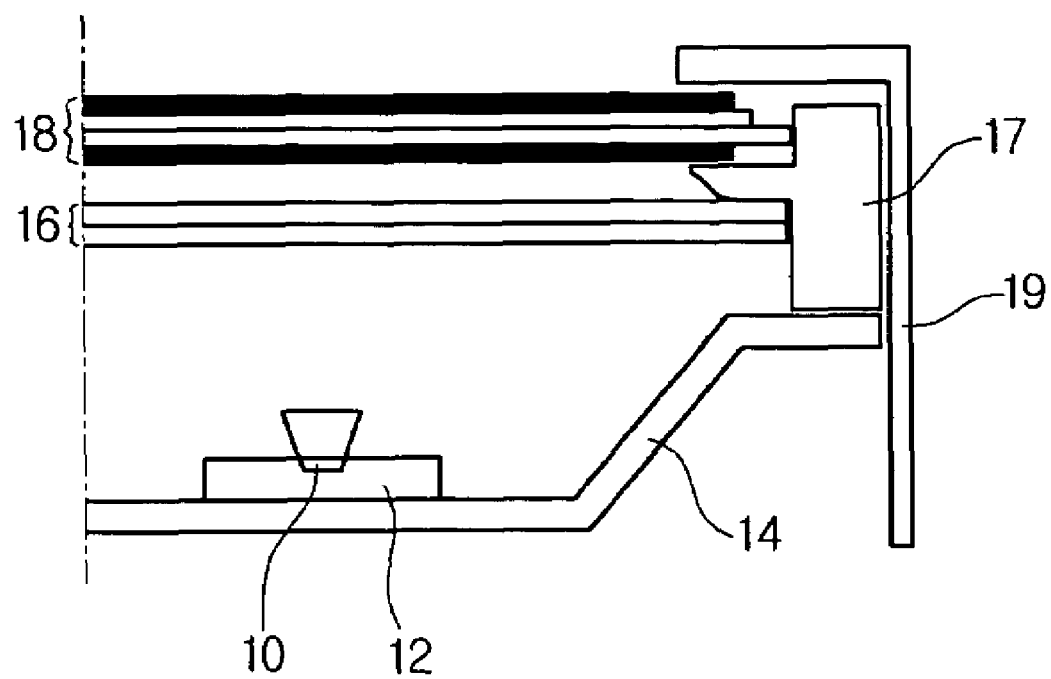
Figure 2A:
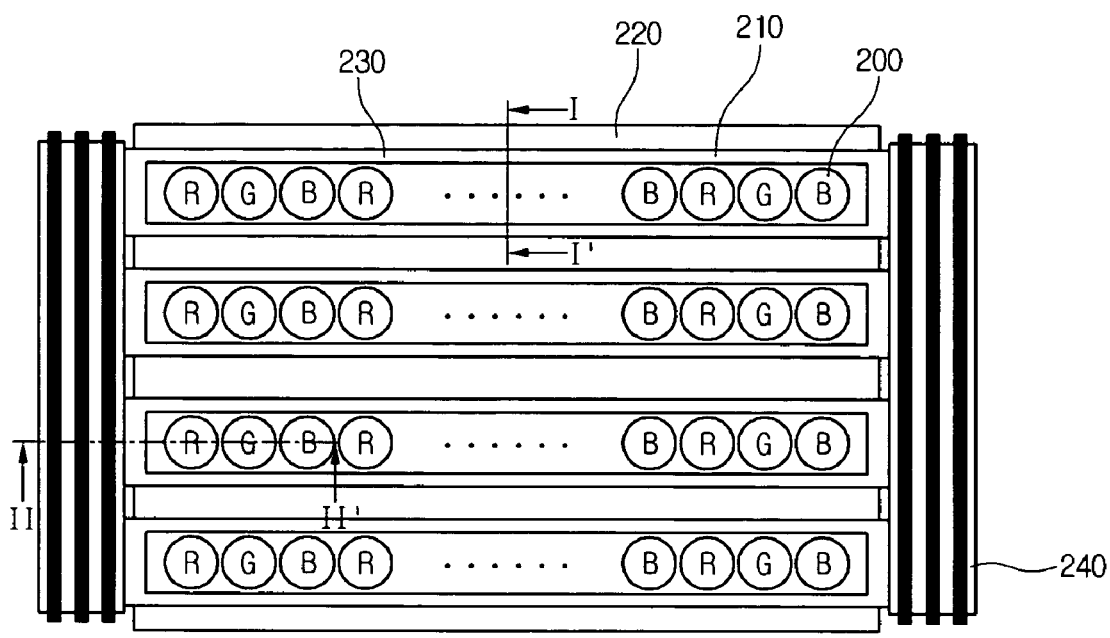
FIG. 2A shows a plane view of a backlight unit of an LCD according to the invention.
Figure 2B:
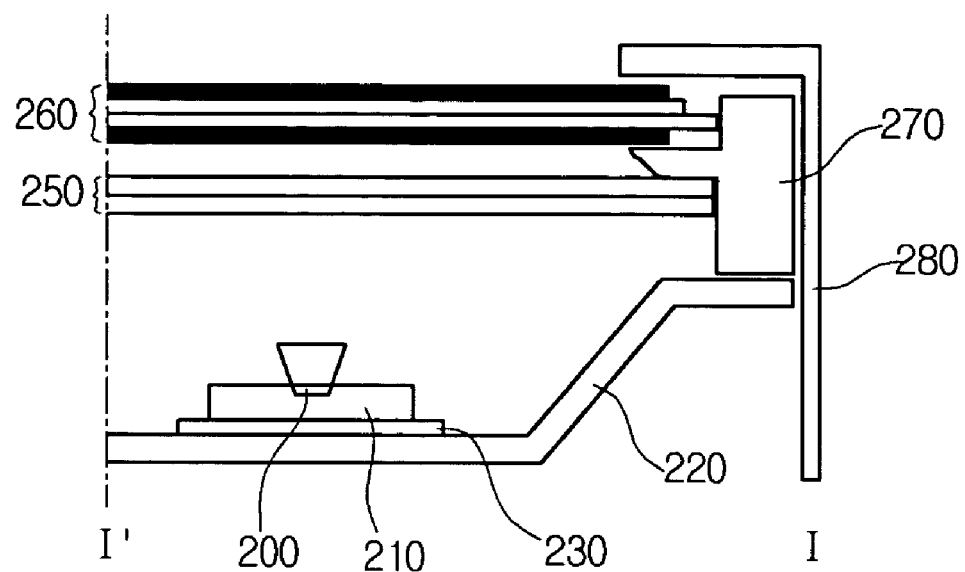
FIG. 2B shows a sectional view taken along the line I-I' of FIG. 2A.

FIG. 2A shows plane view of a backlight unit of an LCD according to the invention, FIG. 2B shows a sectional view taken along the line I-I' of FIG. 2A, and FIG. 2C shows a sectional view taken along the line II-II' of FIG. 2.

Referring to FIGS. 2A through 2C, the direct type backlight unit includes multiple LEDs 200 for generating light, a printed circuit board (PCB) 210 disposed below the LEDs 200, and a bottom cover 220 over which the PCB 210 is mounted. Optical sheets 250 include a diffusion sheet for diffusing the light generated by the LEDs 200. A heat pipe 230 is disposed in the form of a plate between the PCB 219 and the bottom cover 220, and a heat sink 240 is disposed outside the bottom cover 220, for radiating heat generated from the LEDs 200 and transmitted to the heat pipe 230 to the outside. The blown-up section of FIG. 2C shows the continuity of the heat pipe 230 as it passes through the bottom cover 220 to connect with the heat sink 240.

The invention includes the heat pipe 230 and the heat sink 240 to maximize the heat radiation capacity of the LEDs 200, because the LEDs 200 have high heat generation. Heat generated at the light emission regions of the LEDs transmits to the heat sink 240 disposed at both sides of the bottom cover 220 through the heat pipe 230. The heat pipe 230 has a cylindrical or plate shape and is disposed between the PCB 210 and the bottom cover 220, and heat radiation can thus be more easily and actively performed.

The PCB 210 has a rectangular shape, and the LEDs 200 are mounted on the PCB 210. However, the PCB 210 is not restricted to a rectangular shape and any other appropriate shape (square, round, oval, triangle etc.) can be used.

Over the bottom cover 220, the PCBs 210 are arranged corresponding to each line.

Also, the LCD panel 260 is positioned above the backlight unit as shown in FIGS. 2B and 2C. The LCD panel 260 and the backlight unit are supported by a guide panel 270 and are fixed by a top case 280.

In addition, the PCB 210 is configured to include a circuit for controlling the LEDs 200. The PCB 210 supports the LEDs 200 and simultaneously controls light emission of the LEDs 200 using the controlling circuit for the LEDs 200.

It is preferable that the PCB 210 be a metal core PCB (MCPCB) that is suited for a PCB for an LED array.

The optical sheets 250 include the diffusion sheet and are spaced apart by a predetermined distance from the LEDs 200 such that the different lights generated by the LEDs 200 have a uniform distribution.

As shown in FIG. 2A, the LEDs 200 include red (R), green (G) and blue (B) LEDs, which are arranged sequentially. For example, the LEDs 200 are turned on or off in the order of R of $1^{st}$ line→R of $2^{nd}$ line→R of $3^{rd}$ line→G of $1^{st}$ line→G of $2^{nd}$ line→G of $3^{rd}$ line→B of $1^{st}$ line→B of $2^{nd}$ line→B of $3^{rd}$ line. However, other sequences can be used.

Accordingly, the LEDs 200 sequentially generate red (R) light, green (G) light and blue (B) light as spot light sources. Since the LEDs 200 have a lower light efficiency than the related art CCFLs, more power is consumed to result in the generation of excess heat.

To solve the above problem, the invention includes the heat pipes 230 disposed between the PCB 210, where the heat pipes 230 facially contact the LEDs 200, and the bottom cover 220. The heat pipes 230 radiate heat generated from the LEDs 200 to the outside of the backlight unit. Also, the heat sink 240 is disposed at ends of the heat pipes 230 in order to maximize the heat radiation, i.e., cooling efficiency. The heat pipes 230 preferably have a plate shape.

Figure 3:
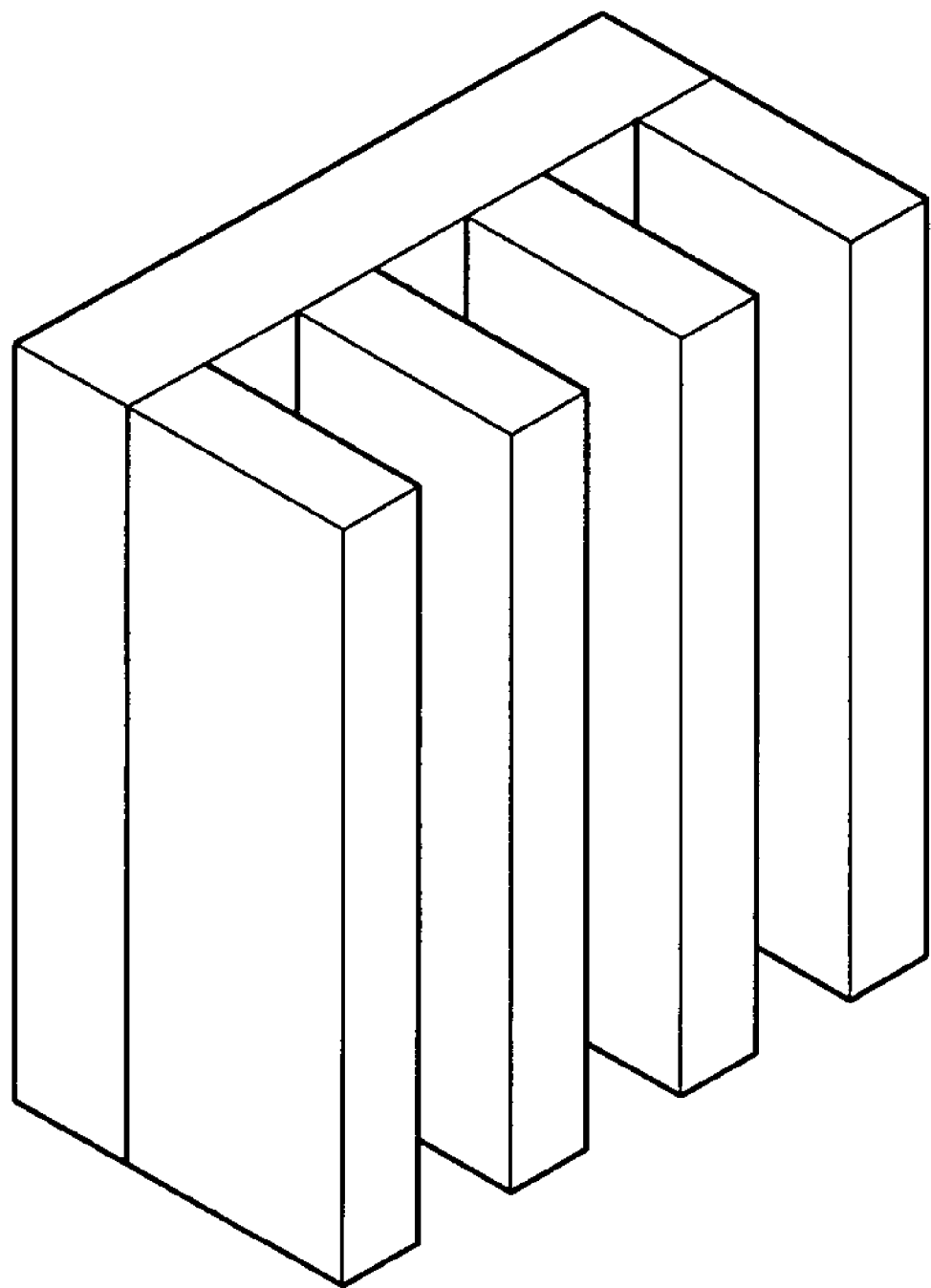
FIG. 3 shows a perspective view of a heat sink in a backlight unit according to an embodiment of the invention.

Preferably, the heat sink 240 is an extrusion type heat sink as shown in FIG. 3. The heat sink 240 is preferably formed at a side portion of the bottom cover 220, i.e., within the concave region shown in FIG. 2C. A thermal grease or adhesive can be used to afford better contact between the heat sink 240 and the device.

Also, the heat pipes 230 transmit the heat generated by the LEDs 200 by using the latent heat of a working fluid filling each of the heat pipes 230. The working fluid is generally water due to its high latent heat, but any appropriate working fluid can be used, including alcohols, ketones, ethers, ethylene glycol, propylene glycol, triethylene glycol and glycol ethers. Additionally, both ends of the heat pipes 230 are connected to the heat sink 240.

Figure 6A:
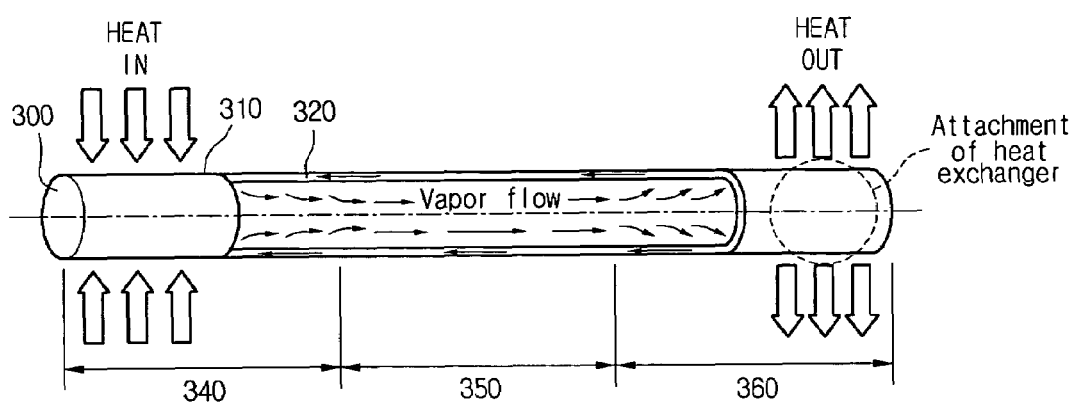
FIG. 6A shows a longitudinal view of a heat pipe according to a preferred embodiment of the invention.
Figure 6B:
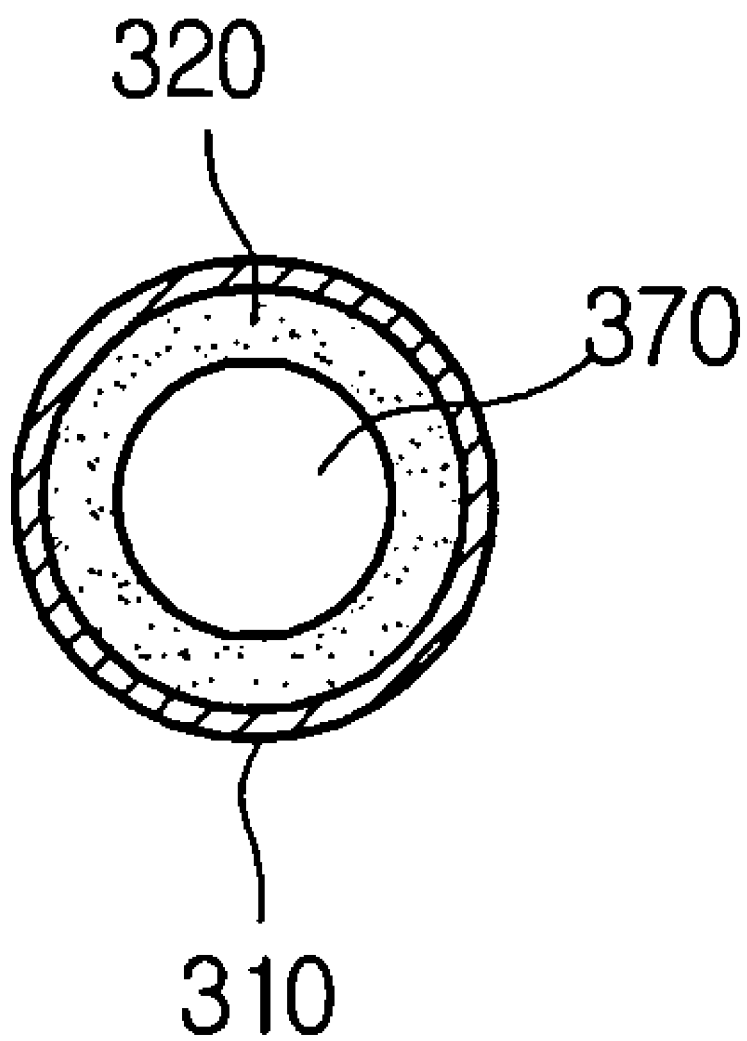
FIG. 6B shows a cross sectional view of the heat pipe of FIG. 6A.

FIG. 6A shows a longitudinal view of a heat pipe 300 (equivalent to one of the heat pipes 230) according to a preferred embodiment of the invention. FIG. 6B shows a cross sectional view of the heat pipe of FIG. 6A. The heat pipe has a cylindrical outer container 310 that surrounds a layer of wick or wicking material 320. The interior of the outer container 310 serves as a vapor core 370 that allows vapor flow.

The heat pipe 300 has three functional sections: an evaporator 340, an adiabatic section 350 and a condenser 360. The evaporator 340 absorbs heat and evaporates liquid carried by the wick 320. The vapor of the evaporated liquid passes through the adiabatic section 350 in the vapor core, and no substantial heat exchange occurs in the adiabatic section. In the condenser 360 the vapor condenses to release latent heat of condensation that radiates to the exterior of the container 310. The condensed liquid is conveyed back to the evaporator 340 along the wick 320 by capillary action. The condenser 360 is attached to the heat exchanger to eliminate the waste heat.

The heat pipe 300 can be formed from any suitable material such as copper, tungsten, ceramics, stainless steel, etc. The wick 320 can be formed from any suitable material capable of capillary action, including woven textiles, noon-woven materials such as polyester, porous ceramics, etc. The liquid/vapor is preferably water, which has a latent heat of 2240 KJ/Kg at 70° C. However, any suitable liquid can be used, such as alcohol, glycols, glycol ethers, ethers, ketones and other organic solvents.

Figure 7:
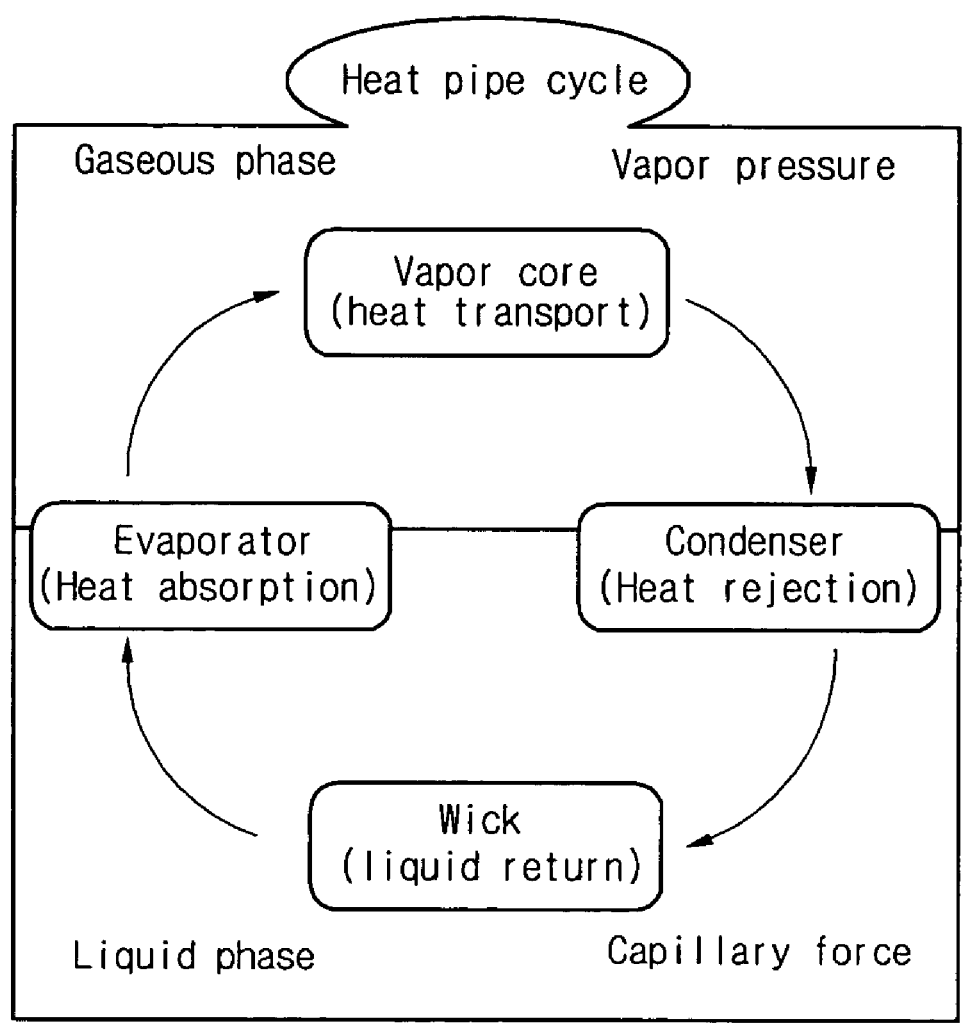
FIG. 7 shows the heat pipe heat cycle.

The heat pipe cycle is illustrated in FIG. 7. Heat adsorption is performed in the evaporator 340 to transform the liquid into the gaseous phase. Heat transport is accomplished by passage of the vapor through the vapor core 370. The condenser 360 condenses the vapor to liquid and rejects the heat to be eliminated by the heat exchanger. The liquid returns by the wick 320 to the evaporator using capillary action.

The heat pipe's characteristics include having no moving parts to result in noise-free operation. The cycle a permanent loop that requires no power input. A very small temperature difference is required to pump the heat. However, a heat exchanger such as a heat sink or fan is required.

Figure 4:
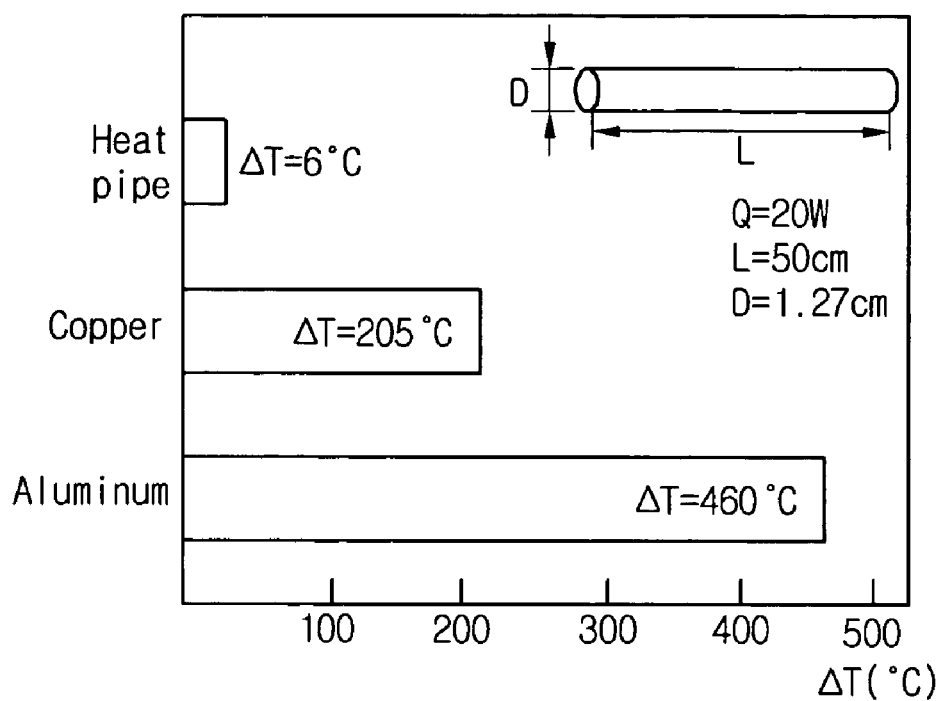
FIG. 4 is a graph showing heat the transfer capability of a heat pipe.

FIG. 4 shows a graph of the heat transmission capability of the inventive and conventional heat pipes.

Referring to FIG. 4, the heat pipe of the invention has a temperature difference $\Delta T$ of only 6° C., copper has a temperature difference $\Delta T$ of 205° C., and aluminum has a temperature difference $\Delta T$ of 460° C. In FIG. 4, the temperature difference $\Delta T$ indicates a temperature difference necessary for transmitting a predetermined amount of heat. The obtained temperature values were measured using samples each having a length (L) of 50 cm and a thickness (D) of 1.27 cm. In this measurement, 20 W calories (Q) were provided to the samples.

The above measurement result shows that the inventive heat pipe has a reduced amplitude of the temperature difference necessary to transmit a set amount of heat, when compared to conventional aluminum or copper. Accordingly, the heat pipe mounted on the backlight unit is very advantageous in terms of uniform temperature distribution and heat conduction as compared to the heat conduction of metal (copper or aluminum).

Also, if the heat pipe is not mounted on the backlight unit, then the backlight unit requires a large temperature difference between a mid portion of the backlight unit and the sides to which heat should be conducted such that the heat generated in the heat generation region is conducted along a predetermined path. Accordingly, when metal is used in the backlight, the backlight has a limited cooling performance.

Figure 5:
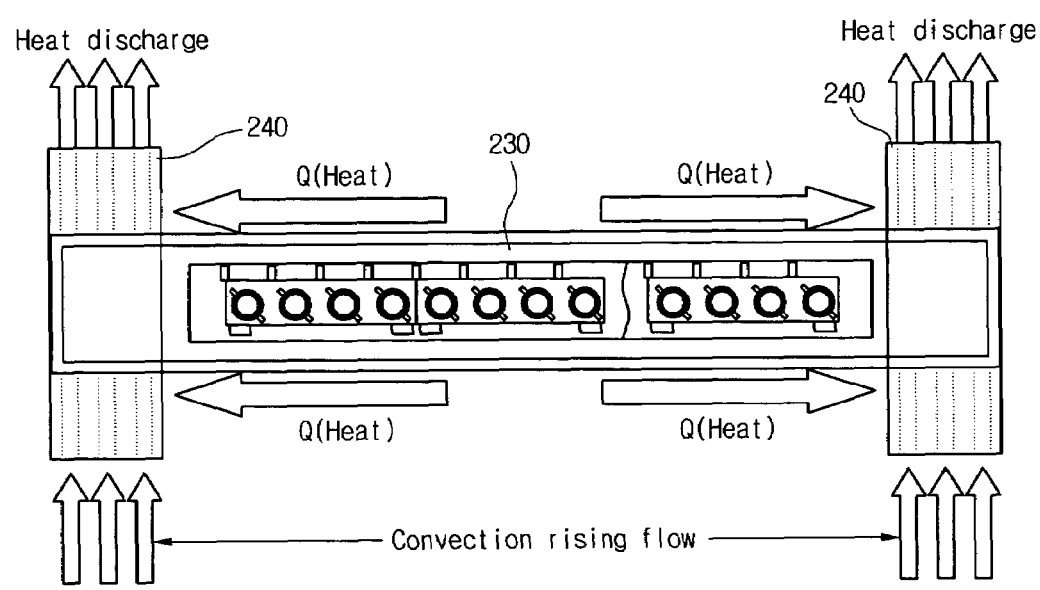
FIG. 5 shows a schematic view illustrating a cooling path of heat generated from LEDs by a backlight unit according to the invention.

FIG. 5 shows a schematic view illustrating the cooling, i.e., heat transfer, path of heat generated from LEDs by a backlight unit according to the invention.

As described above, the backlight unit of the invention is provided with the heat pipe 230 for conducting heat generated in the LEDs to side portions and the heat sink 240 for radiating to the outside.

The heat pipe 230 is disposed between the PCB by facially contacting the LEDs and the bottom cover, and the heat sink 240 is disposed at a side portion of the bottom cover to radiate the heat conducted through the heat pipe 230 to the outside of the device.

FIG. 5 illustrates that according to the cooling structure of the invention, high temperature or heat generated from the LEDs is conducted to the heat sink 240 disposed at both side portions of the backlight without a large temperature differential. As a result, it is possible to sharply lower the temperature of the backlight.

Also, the evaporation temperature of the heat pipes 230 is freely adjustable by adjusting the internal pressure of the heat pipes, and it is thus possible to easily control the temperature of the backlight by matching the heat sink 240 with the heat pipes 230 through design optimization of the heat sink 240.

Accordingly, the backlight unit of the invention renders it possible to actively cool the backlight provided with the LEDs.

In addition, since the backlight has the heat pipe 230 for conducting heat generated in the LEDs to side portions and the heat sink 240 for radiating the conducted heat to the outside, the temperature increase in the light emission region is suppressed as much as possible. The thermal reliability of the LEDs is thus enhanced and light efficiency is thus increased to increase the brightness and decrease the power consumption.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight unit having at least two opposing sides, comprising:
    a plurality of light emitting diodes (LEDs);
    a printed circuit board (PCB) for mounting the LEDs;
    a cover;
    a heat pipe disposed between the PCB and the cover; and
    at least two heat sink each disposed adjacent a surface of the cover and located at one or another of the two opposing sides of the backlight unit, and connected to an end of the heat pipe.

2. The backlight unit according to claim 1, wherein the heat pipe has a cross section that comprises:
    an outer container;
    a vapor core inside the outer container; and
    a wick between the outer container and the vapor core.

3. The backlight unit according to claim 1, wherein the heat pipe has an elongated axis that extends from one side portion of the unit to an opposite side portion of the unit and longitudinally comprises:
    an evaporator section connected to one heat sink;
    an adiabatic section adjacent to the evaporator section; and
    a condenser section adjacent to the adiabatic section and connected to the other heat sink.

4. The backlight unit according to claim 1, wherein the heat pipe is formed from copper, tungsten, ceramic or stainless steel.

5. The backlight unit according to claim 1, further comprising an optical sheet spaced apart by a predetermined distance from the LEDs.

6. The backlight unit according to claim 1, wherein the heat pipe has a plate shape.

7. The backlight unit according to claim 1, wherein the heat sinks are disposed proximate side edges of the cover.

8. The backlight unit according to claim 1, wherein the PCB further comprises a circuit for controlling light emission by the LEDs.

9. The backlight unit according to claim 1, wherein the PCB is a metal core PCB.

10. The backlight unit according to claim 1, wherein each of the heat sinks is disposed adjacent an outer surface of the cover on a side opposite the PCB.

11. A backlight unit having at least two opposing sides, comprising:
    a plurality of light emitting diodes (LEDs) arranged in lines;
    a plurality of printed circuit boards (PCBs) for mounting the LEDs;
    a cover;
    a plurality of heat pipes disposed between the PCBs and the cover; and
    at least two heat sinks each disposed adjacent a surface of the cover and located at one or another of the two opposing sides of the backlight unit, and connected to an end of the heat pipe.

12. The backlight unit according to claim 11, wherein each heat pipe has a cross section that comprises:
    an outer container;
    a vapor core inside the outer container; and
    a wick between the outer container and the vapor core.

13. The backlight unit according to claim 11, wherein each heat pipe is formed from copper, tungsten, ceramic or stainless steel.

14. The backlight unit according to claim 11, wherein each heat pipe of the plurality of heat pipes corresponds to one of the plurality of PCBs.

15. The backlight unit according to claim 11, further comprising an optical sheet spaced apart by a predetermined distance from the LEDs.

16. The backlight unit according to claim 11, wherein the heat pipes are plate shaped.

17. The backlight unit according to claim 11, wherein the heat sinks are disposed at opposite sides of the cover.

18. The backlight unit according to claim 11, wherein the PCBs further comprise a circuit for controlling light emission by the LEDs.

19. The backlight unit according to claim 11, wherein the PCBs are metal core PCBs.

20. The backlight unit according to claim 11, wherein the heat sinks are disposed over an outer surface of the cover.

21. The backlight unit according to claim 11, wherein each heat pipe has an elongated axis that extends from one side portion of the unit to an opposite side portion of the unit and longitudinally comprises:
    an evaporator section corresponding to the first portion of each heat pipe;
    an adiabatic section adjacent to the evaporator section; and
    first and second condenser sections adjacent to the adiabatic section and corresponding to the second and third portions of each heat pipe.

22. The backlight unit according to claim 21, wherein the condenser section of each heat pipe is connected to a heat sink.

* * * * *